US011199060B2

(12) United States Patent
Cook et al.

(10) Patent No.: US 11,199,060 B2
(45) Date of Patent: Dec. 14, 2021

(54) METHOD AND MODEL FOR WELLBORE STRENGTHENING BY FILTERCAKE

(71) Applicant: SCHLUMBERGER TECHNOLOGY CORPORATION, Sugar Land, TX (US)

(72) Inventors: John Mervyn Cook, Cambridge (GB); Quanxin Guo, Sugar Land, TX (US); Paul William Way, Cambridge (GB); Louise Bailey, St. Neots (GB); Simon James, Le Plessis-Robinson (FR); Salim Taoutaou, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 362 days.

(21) Appl. No.: 16/082,074

(22) PCT Filed: Mar. 1, 2016

(86) PCT No.: PCT/IB2016/000659
§ 371 (c)(1),
(2) Date: Sep. 4, 2018

(87) PCT Pub. No.: WO2017/149345
PCT Pub. Date: Sep. 8, 2017

(65) Prior Publication Data
US 2020/0284109 A1 Sep. 10, 2020

(30) Foreign Application Priority Data
Mar. 1, 2016 (EP) .................................. 16305237

(51) Int. Cl.
E21B 21/00 (2006.01)
C04B 20/00 (2006.01)
(Continued)

(52) U.S. Cl.
CPC ........ *E21B 21/003* (2013.01); *C04B 20/0048* (2013.01); *C04B 28/02* (2013.01);
(Continued)

(58) Field of Classification Search
CPC ...... E21B 21/003; E21B 33/138; E21B 33/14; C04B 20/0048; C04B 28/02; C09K 8/36; C09K 8/487; C09K 8/5045; G01N 3/12
See application file for complete search history.

(56) References Cited

U.S. PATENT DOCUMENTS 5,711,383 A * 1/1998 Terry ...................... C04B 28/02
175/72
7,431,106 B2 10/2008 Alberty et al.
(Continued)

FOREIGN PATENT DOCUMENTS

EP 2261458 A1 12/2010
GB 2409690 A 7/2005
WO 2012170382 A1 12/2012

OTHER PUBLICATIONS

Benbow et al., "The flow of pastes through dies of complicated geometry", Powder Technology, vol. 65, issue 1-3, 1991, pp. 393-401.
(Continued)

Primary Examiner — Crystal J Miller

(57) ABSTRACT

Methods for drilling a wellbore into a subterranean formation include preparing a drilling fluid and circulating the drilling fluid in the wellbore while drilling in the subterranean formation, forming a filtercake from the drilling fluid, creating or encountering one or more fractures in the subterranean formation while drilling, and allowing a portion of the filtercake formed to at least partially seal the one or more fractures while continuing the drilling.

22 Claims, 12 Drawing Sheets

(51) Int. Cl.
*C04B 28/02* (2006.01)
*C09K 8/36* (2006.01)
*C09K 8/487* (2006.01)
*C09K 8/504* (2006.01)
*E21B 33/138* (2006.01)
*E21B 33/14* (2006.01)
*G01N 3/12* (2006.01)

(52) U.S. Cl.
CPC .............. *C09K 8/36* (2013.01); *C09K 8/487* (2013.01); *C09K 8/5045* (2013.01); *E21B 33/138* (2013.01); *E21B 33/14* (2013.01); *G01N 3/12* (2013.01); *C09K 2208/08* (2013.01); *G01N 2203/0019* (2013.01); *G01N 2203/0048* (2013.01); *G01N 2203/0062* (2013.01); *G01N 2203/04* (2013.01)

(56) References Cited

U.S. PATENT DOCUMENTS

| | | | |
|---|---|---|---|
| 7,799,743 | B2 | 9/2010 | Way et al. |
| 8,215,155 | B2 | 7/2012 | Bailey et al. |
| 8,393,411 | B2 | 3/2013 | Dupriest et al. |
| 8,602,114 | B2 | 12/2013 | Bailey et al. |
| 2013/0143777 | A1* | 6/2013 | Wang ............... G01N 19/08 507/204 |
| 2014/0209307 | A1* | 7/2014 | Jamison ............. C09K 8/42 166/292 |
| 2014/0299333 | A1 | 10/2014 | Cook et al. |
| 2015/0292278 | A1 | 10/2015 | Wang |

OTHER PUBLICATIONS

Bong et al., "Fractured Wellbore Stress Analysis: Sealing Cracks to Strengthen a Wellbore", SPE/IADC 104947, Feb. 22, 2007, 15 pages.
Aston et al., "A New Treatment for Wellbore Strengthening in Shale", SPE 110713, Nov. 14, 2007, 7 pages.
International Search Report and Written Opinion issued in International Patent Application No. PCT/IB2016/000659 dated Jan. 3, 2017; 16 pages.

* cited by examiner

METHOD AND MODEL FOR WELLBORE STRENGTHENING BY FILTERCAKE

FIELD

The field to which the disclosure generally relates to drilling of wells into a subterranean formation, and more particularly, methods, systems and materials are provided for controlling loss of drilling and cementing fluids from a wellbore during the well construction process.

BACKGROUND

This section is intended to introduce the reader to various aspects of art, which may be associated with exemplary embodiments of the present techniques, which are described and/or claimed below. This discussion is believed to be helpful in providing the reader with information to facilitate a better understanding of particular aspects of the present techniques. Accordingly, it should be understood that these statements are to be read in this light, and not necessarily as admissions of prior art.

As a general method of forming a wellbore, e.g. for extraction of oil or gas from a formation, a drilling operation typically involves mounting a drill bit on a drilling assembly (the "bottom hole assembly") at the lower end of a drill string and rotating the drill bit against the bottom of a hole to penetrate the formation, thereby creating a wellbore.

A drilling fluid, such as a "drilling mud", typically circulates down through the drill string, passes via the drill bit, and returns back to the surface, usually in the annular portion between the drill string and the wall of the wellbore. The drilling fluid serves a number of purposes, including lubricating the drill bit and cooling the drilling assembly. However, the drilling fluid can also be suitably pressurized by adjusting its density or surface pressure or both to provide sufficient hydrostatic pressure at the wellbore wall to prevent the flow of fluids into the wellbore from the surrounding formation.

Such relatively high pressure can produce undesirable mechanical forces on the formation, which may lead to wellbore damage, or even fractures forming in the adjacent formation. In particular, as the wellbore deepens the hydrostatic pressure at the lower end of the wellbore can be significantly higher than the pressure near the entrance aperture of the wellbore, which may lead to fractures formed along the wellbore. These circumstances can lead to loss of drilling mud into the surrounding formation. Additionally, drilling fluids may be lost if the wellbore meets an existing or natural fracture providing an outlet for the drilling fluids. The solids in the mud are normally not capable of plugging the open mouths of either the newly formed or the pre-existing fractures and losses can be unexpected, uncontrollable, and/or in unacceptable volumes. Such lost amount of drilling mud is often referred to as "lost returns" and the condition is referred to as "lost circulation". Lost circulation is considered both a cost and safety issue.

Some forms and amounts of fluid loss are considered acceptable and are expected. For example, some drilling fluid filtrate is lost due to the permeability of the formation. As mud is in contact with the small openings in the rock and under pressure, some filtration will occur and the solids within the fluid will eventually plug the openings and form a filter cake on the wellbore wall. The volumes of filtrate lost are small and decline with time.

In some cases, it has been necessary periodically to halt the drilling operation, provide a casing within the wellbore to provide structural support, and cement the casing in place to the wall of the wellbore. In any event, to be able to drill a deep wellbore or a wellbore in a relatively unstable formation (e.g. a shale or clay formation), the drilling operation must be halted repeatedly to allow the wellbore to be so encased. This has disadvantages in that it delays the extraction of valuable oil and/or gas from the well and consequently has a negative economic impact.

Thus, needs exist for processes and materials to control lost returns continuously as a well is drilled that is applicable for drilling though low- and/or high-permeability zones that may be depleted in pressure, or have low fracture closure stress for other reasons. The process would preferably require only products normally used in drilling operations. Because of significant uncertainties in downhole conditions, it is essential the process be sufficiently robust to succeed if actual conditions vary from assumed design conditions. Examples of uncertainties that must be successfully accommodated are the fracture width, fracture length, rock properties, permeability, pore pressure, and variability in execution of field procedures.

SUMMARY

This section provides a general summary of the disclosure, and is not necessarily a comprehensive disclosure of its full scope or all of its features.

In a first embodiment of the disclosure, methods for drilling a wellbore into a subterranean formation include preparing a drilling fluid and circulating the drilling fluid in the wellbore while drilling in the subterranean formation, forming a filtercake from the drilling fluid, creating or encountering one or more fractures in the subterranean formation while drilling, and allowing a portion of the filtercake formed to at least partially seal the one or more fractures while continuing the drilling. The filtercake may be formed on a wellbore wall, further formed in a portion of the subterranean formation adjacent the wellbore wall, and even further formed in at least a portion of the fracture(s). The filtercake restricts flow of drilling fluid into the fracture, reduces the pressure applied to the walls of the fracture, and thereby inhibits the lengthening of the fracture. Drilling fluid lost circulation during drilling may be inhibited by at least partially sealing the one or more fractures, and under some conditions, the drilling fluid is filtered through one or more fractures, which forms a non-uniform filtercake to block, or otherwise seal, the one or more fractures. In some aspects, the drilling fluid further includes one or more wellbore strengthening materials, which may help impart preventative wellbore strengthening. The wellbore strengthening material(s) may enter the fracture(s) and form a bridge within the fracture(s), thereby restricting fluid flow to the tip(s) of the one or more fractures. In some cases, at least one of the fractures is induced while drilling, and/or at least one of the fractures is a natural fracture in the subterranean formation.

In some other embodiments, methods include circulating a drilling fluid in a wellbore while drilling the wellbore in a subterranean formation, forming a filtercake from the drilling fluid, creating or encountering one or more fractures in the subterranean formation while drilling, allowing a portion of the filtercake formed to at least partially seal the one or more fractures while drilling, and introducing a cement slurry into wellbore to further build the filtercake and seal the one or more fractures by forming a bridge. The cement slurry may further include fibers. In some aspects, the cement slurry remains fluid while being introduced into the wellbore, but sets at the mouth of, and/or at the walls of, the fracture(s), and may in some cases, eventually set in the fracture(s). The filtercake present in the fracture(s) may bridge the fracture(s) thus allowing wellbore pressure to be maintained above the value that would be possible in the absence of the bridge, which in some circumstances allows drilling operations to continue.

Yet other embodiments are methods which include circulating a cement slurry in a wellbore penetrating a subterranean formation, encountering one or more fractures in the subterranean formation while circulating the cement slurry, and allowing a filtercake to form which at least partially seals the one or more fractures while circulating the cement slurry. In some aspects, the cement slurry is further introduced into the one or more fractures to further seal the fracture(s). The wellbore may be open hole, or a cased wellbore where the cement slurry circulates through the casing and then into an annulus formed between the casing and the subterranean formation. The cement slurry may remain fluid while being introduced into the wellbore, and in some cases, the cement slurry sets and forms a filtercake at the mouth of, and/or at the walls of, the fracture(s). In some aspects, the filtercake and the cement present in the one or more fractures bridge the fracture(s) thus allowing wellbore pressure to be maintained up to 20 MPa above the wellbore pressure value when the one or more fractures were encountered. At least one of the fractures may be induced while circulating the cement, and/or at least one of the fractures is a natural fracture present in the subterranean formation.

Yet another embodiment of the disclosure is a method which includes providing an apparatus having a block of test medium, such as a rock block, with a bore there through. The apparatus further includes a holder for securing the block, which has a drainage port in fluid communication with the block, and a pressure transducer in fluid communication with a second end of the bore. When the bore is filled with drilling fluid and pressurized, a filtercake forms on the surface of the bore. In some cases, a fracture is created in the block, and a filtercake may be further built across the exposed mouth of the fracture, while in some other instances, the block is fractured before securing in the holder, and filtercake is formed on faces of the fracture. The pressure properties of the filtercake may be characterized, and the sealing performance of the filtercake determined by increasing pressure to gradually open the fracture until seal failure. The method may be repeated as necessary to identify a drilling fluid composition with sufficient filtercake sealing properties. The drilling fluid composition is then circulated in a wellbore while drilling the wellbore in a subterranean formation, and a filtercake forms on the wellbore wall, across the mouth(s) of fracture(s), and/or even formed on faces of fracture(s).

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
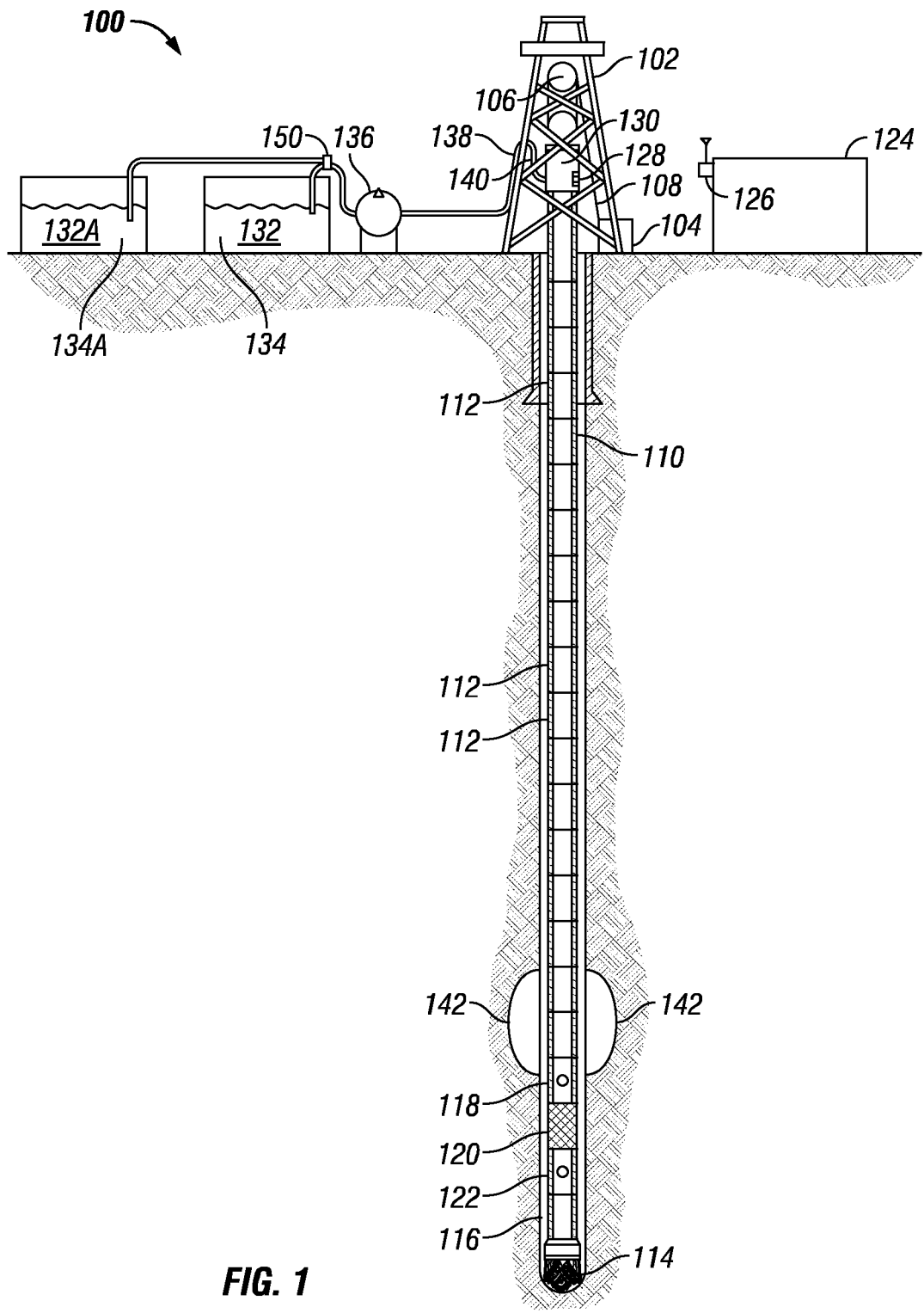
FIG. 1 shows a system for drilling a wellbore through a subterranean formation in accordance with some method embodiments of the disclosure, in a schematic view.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition or methods can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration, dimension, or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The inventors have discovered, in some embodiments, techniques for effectively using the filtercake formed during drilling for inhibiting the growth of fractures induced, or otherwise encountered, and/or natural fractures encountered, during drilling, in the formation adjacent the wellbore, that would otherwise cause lost circulation, and which would also lead to increasing the pressure that the wellbore can sustain, during drilling and/or cementing. In some aspects of the disclosure, the increase in pressure is that which the wellbore can support above the fracture initiation pressure of the surrounding formation. For example if the ambient hydrostatic pressure in the wellbore is 30 MPa while drilling and the rock fractures, then the formation of the filtercake may prevent fracture growth (and thus lost circulation) up to a pressure of 46 MPa, where the pressure increase is 16 MPa. Any suitable, or resultant, value of pressure increase is within the scope of the disclosure, including, but not limited to up to about 5 MPa, 10 MPa, 20 MPa, 30 MPa, or any value between zero and such upper limits.

Tests and modeling have shown that the filtercake, in some cases, can bridge the very narrow fractures that form at stages of drilling or cementing, and thus prevent drilling fluid or cement slurry flow into the fracture, which would then allow the fracture to extend and widen. Thus, in accordance with the disclosure, a filtercake is used to inhibit drilling fluid flow into the fracture and the growth of the fracture, leading to an increase in the maximum pressure that the wellbore can contain without significant leakage. This mechanism of wellbore strengthening by filtercake may apply to sealing and strengthening of both natural fractures and drilling or cement induced fractures. As used in accordance with the disclosure, the terminology "encountering one or more fractures" in the subterranean formation means any one, or combination of, inducing, creating or otherwise forming fracture(s), or encountering natural fracture(s), while drilling a wellbore, cementing in a wellbore, or any other wellbore treatment.

In another aspect of the disclosure, the capability of a filtercake to inhibit growth of the fractures using wellbore strengthening materials in the drilling fluid or cement slurry is provided. Laboratory tests revealed additional effectiveness of a filtercake through incorporation of wellbore strengthening materials to provide preventive wellbore strengthening. Although not limited to any particular theory of operation, inventors observe that particles of wellbore strengthening materials, when added to the fluid or slurry, and sized to enter the fractures, may form a bridge within the fractures, and restrict fluid flow to the fracture tip, thus preventing the fracture from further extending into the formation and/or widening. In such embodiments, wellbore strengthening using the filtercake, enhanced with wellbore strengthening materials, builds a barrier at or very close to the mouth of a growing fracture rather than within it, at a very early stage in a lost circulation condition. In some applications, such embodiments are particularly useful in drilling through depleted formations. Hence, the ability of filtercake in inhibiting or even blocking fracture growth and thereby strengthening the wellbore can be enhanced with materials added to the drilling fluid, or drilling practice. This mechanism of wellbore strengthening by filtercake may apply to sealing and strengthening of both natural fractures and drilling induced fractures, as well.

In another aspect of the disclosure, a simulation technique has been developed to model and predict the wellbore strengthening performance using the methodology described above.

An example of a system for drilling a wellbore through a subterranean formation 100 in accordance with some method embodiments of the disclosure, is shown schematically in FIG. 1. A drilling rig 102 or similar support structure may be disposed at the Earth's surface. The drilling rig 102 includes equipment such as a drawworks 104, sheaves 106 and a drill line 108 configured to movably support a drill string 110 as it drills subsurface formations. The drill string 110 may be formed from segments 112 ("joints") of drill pipe threadedly coupled together end to end. The drill string 110 typically includes a drill bit 114 at a lower end thereof. Rotation of the drill bit 114 and application of axial force to the drill bit 114 by imparting thereto a portion of the weight of the drill string 110 causes the drill bit 114 to crush, chip and/or cut the formations at the longitudinal end (bottom) of the wellbore 116.

The drill string 110 may include various devices, typically proximate the drill bit 114, for measuring properties of the formations surrounding the wellbore 116, for example, logging while drilling ("LWD") sensors 118, for performing certain mechanical functions (e.g. an annular seal or "packer" 120), and for measuring a parameter (e.g., annular pressure sensor 122) in an annular space between the wall of the wellbore 116 and the exterior of the drill string 110. Control of operation of the foregoing example devices, and communication of the measurements made by the various devices to the surface may be performed using the communication channel in the drill pipe string 110. Control signals may be generated, for example, in a recording unit 124 disposed at the Earth's surface. In some aspects, the control signals may be transmitted over a wireless transceiver 126 associated with a recording unit 124 to a corresponding wireless transceiver 128 associated with a top drive 130 suspended in the drilling rig 102. The wireless transceiver 128 associated with the top drive 130 may make electrical and/or optical connection to the communication channel in the drill string 110. Signals from the various sensors in the drill string 110 may be communicated over the signal channel in the drill string 110 to the corresponding wireless transceiver 128. Ultimately, such signals are communicated to the recording unit 124 for decoding and interpretation.

During drilling of the wellbore 116, drilling fluid 132 is delivered from a tank or pit 134 using a pump 136. The discharge side of the pump 136 may be connected to a standpipe 138. The standpipe 138 may be coupled to the top drive 130 using a hose 140 or similar flexible conduit. During drilling, the top drive 130 may provide rotational motion to the drill string 110. Part of the weight of the drill string 110 may be transferred to the drill bit 114 by the rig operator controlling the drawworks 114 so that the drill line 108 moves through the sheaves 106 causing the top drive 130 to move downwardly until the drill bit 114 contacts the bottom of the wellbore 116. The drill line 108 is extended further until a selected portion of the weight of the drill string 110 is applied to the drill bit 114.

The drilling fluid 132 is moved under pressure exerted by the pump 136 ultimately through an interior passage in the drill string 110. The drilling fluid 132 may exit the interior of the drill string 110 through nozzles or jets (not shown) in the drill bit 114 and enter wellbore 116. The discharged drilling fluid serves to lubricate and cool the drill bit 114, and to lift drill cuttings created by the drill bit 114 to the surface. During the drilling process, certain portions of the subsurface formations may have fractures 142 opened therein, such fractures 142 being already present in the formation as natural fractures, or induced by fluid pressure during the drilling operation, or combination of both. The fractures 142 may be held open by the fluid pressure, which may lead to a lost circulation condition where a significant portion of drilling fluid 132 is lost into the subterranean formation through fractures 142. It is within the scope of the disclosure that the fluid 132 may be pumped through the drill string 110, through the drill bit 114 and into an annular space between the drill string 110 and the wellbore 116 to produce fractures 142.

Figure 2A:
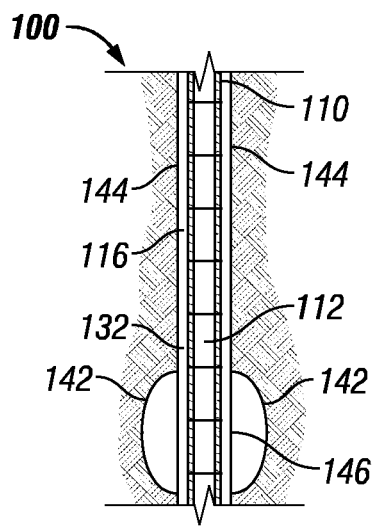
FIGS. 2A-2D depict formation of a filtercake and fracture sealing, during drilling, in accordance with the disclosure, in a cross-sectional view.
Figure 2B:
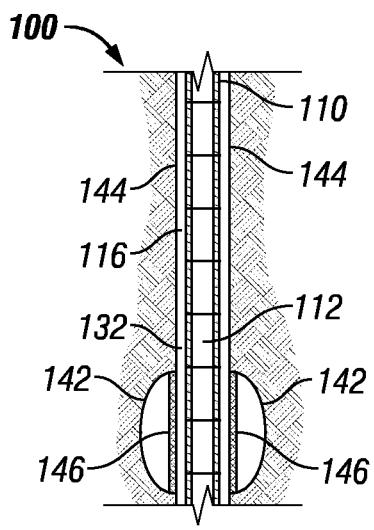
Figure 2C:
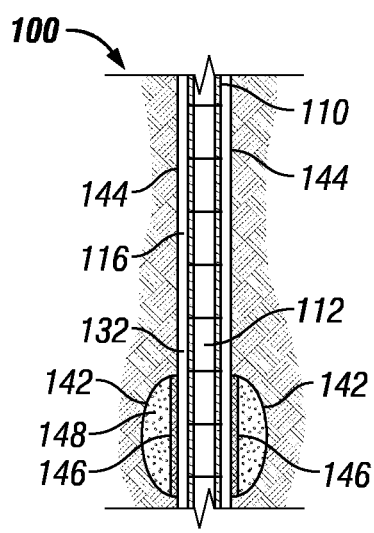

Now referring to FIG. 2A, during the drilling process, a filtercake 144, which is a residue deposited on a permeable medium such as a wall of wellbore 116 when a slurry, such as a drilling fluid, is forced against the wall of wellbore 116 under drilling fluid pressure. Filtrate is the liquid that passes through the permeable medium, leaving the cake on the wellbore wall medium. A certain degree of filtercake 144 buildup is desirable to isolate the subterranean formation 110 from drilling fluid 132. In some embodiments of the disclosure, as the drilling fluid 132 is present and circulating under pressure in the wellbore 116, while drilling through the subterranean formation 100, one or more fractures 142, natural and/or induced, may tend to open due to the drilling fluid pressure. As fractures 142 begin to open, drilling fluid 132 cannot enter the fractures immediately because the mouths of the fractures are covered by a layer of filtercake which has not yet parted over the fracture mouth. The presence of the fracture behind the filtercake may lead to an additional fluid flow through the intact filtercake, which in turn leads to additional filtration of solids from the drilling fluid and an added thickness of filtercake over the mouth of the fracture. Because drilling fluid cannot enter the fractures, wellbore fluid pressure is not exerted on the faces of the fractures. This filtercake building process continues to occur simultaneous to the drilling, and as depicted in FIG. 2B, the filtercake 146 continues to form and may begin to at least partially seal the one or more fractures 142 while drilling, which may allow increased drilling fluid pressure in wellbore 116. In some cases, additionally filter cake 148 may deposit deeper into fractures 142, as depicted in FIG. 2C. If the filtercake properties are such that it can bridge a wider fracture before parting and allowing flow of drilling fluid into the fracture, a higher wellbore pressure can be sustained without loss. In some aspects, the fluid can bridge mainly at the fracture(s) mouth or opening, and in some other aspects, where the fracture mouth is wider, sealing occurs through formation of a filter cake inside the fracture. Also, filtercake formation at the fracture mouth can occur for larger fractures when suitable materials are added to the fluid to create a support, on which to form a filtercake, or slow down total fluid flow.

Filtercake, 144 and/or 146, inhibits drilling fluid 132 from flowing into the fracture 142 as well the growth of the fracture 142, and thus strengthens the wellbore 116. In some embodiments, the fracture(s) 142 can be initiated, but will not cause large amount of drilling fluid 132 loss initially when the fracture(s) 142 mouth is narrow and blocked by filtercake, 144 and/or 146. Large amount of drilling fluid loss is caused by failing to prevent fracture(s) 142 from growing uncontrollably. Laboratory tests have shown that the formation 100 can be fractured, but if the fracture is blocked at the wellbore by filtercake, there will not be a large amount of drilling fluid loss, which is described in further detail below.

Referring again to FIG. 1, alternatively, a second tank 132A may be filled with a different fluid 134A, such as a cement slurry, in some embodiments. When a suitable control command is generated by the recording system 124, a switching valve 150 may couple the intake of the pump 136 to the second tank 132A so as to pump the second fluid 134A through the drill string 110. The second fluid 134A may have composition and rheological properties particularly suited to seal fracture(s) (e.g., 142 in FIGS. 1, 2A and 2B), while the fluid 132 in the first mentioned tank may, on the other hand, have composition and rheological properties particularly suited for wellbore drilling. The second fluid 134A, may be pumped through drill string 110 and delivered to fracture(s) 142, either by passive through drill bit 114, or spot placed at the opening of the fracture(s) by repositioning the drill string 110. In some other aspects, the second fluid 134A, may be pumped through the annulus formed between the drilling string 110 and wall of the wellbore 116. Notwithstanding the particular technique used from delivering the second fluid 134A, it is within the scope of the disclosure that the second fluid 134A be delivered to the fracture(s) 142 by any suitable method and equipment.

Figure 2D:
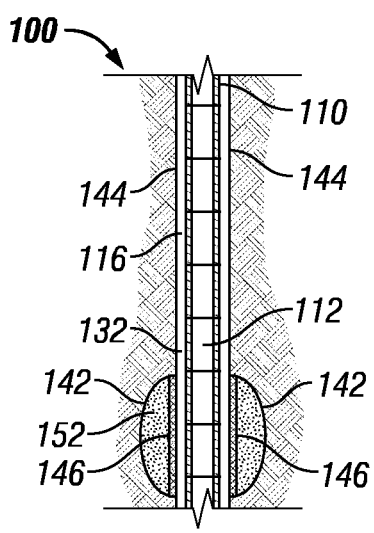

With reference to FIG. 2D, when the second fluid 134A is delivered to the fracture(s) 142, the second fluid 134A may flow into openings between filtercake 146 layers, and/or penetrate filtercake 146, which may effectively further seal the one or more fractures 142 by depositing a sealant 152 therein. In some aspects, second fluid 134A is a cement slurry, which includes any suitable type of cement, such as, but not necessarily limited to class A Portland cement, class G cement, class H cement, and the like. In some aspects, the cement slurry remains fluid while being introduced into the one or more fractures 142, and the cement slurry sets in the one or more fractures once resident in the fracture(s) 142. In some embodiments, the cement slurry further includes a fiber component, such as Cem-FIL® 70, by non-limiting example, which is available from Owens Corning. In cases where a fiber component is included, larger fracture widths may be plugged, such as widths up to about 3 mm. In some aspects, use of the second fluid 134A enables sufficient fracture sealing such that the wellbore pressure may be maintained above the value that would be possible in the absence of the seal, in some circumstances, allowing operations to continue.

In some embodiments according to the disclosure, drilling fluid 132 is amended with wellbore strengthening materials, and in some cases the wellbore strengthening materials are added in a continuous manner to the drilling fluid 132, when the fracture(s) 142 is encountered or develops. The wellbore strengthening materials may further improve the ability of the filtercake to block fracture growth, and provide a stronger filtercake for inhibiting drilling fluid flow into the fracture(s) 142 thus sustaining much higher wellbore pressure without causing lost circulation, and imparting preventative wellbore strengthening. In operation, the wellbore strengthening materials may form a bridge within the one or more fractures, thereby restricting fluid flow to the tip(s) of the one or more fractures. As the pressure drops in the fracture after the filtercake 144 or 146 is deposited and wellbore strengthening materials bridge, and compressive forces from the formation transfer to the filtercake and wellbore strengthening materials. Any wellbore strengthening materials known to those of skill in the art may be added to the drilling fluid, including, but not limited to, graphite particles, marble particulates, sized nut husks, ground petroleum coke, sized cellulosic materials, hard granular fibers, natural or synthetic fibers, swellable materials, reactive materials, mica, polymers, and the like.

While the above description and FIGS. 1 through 2D describe use with drilling fluids, a similar application may be used with cement slurries and cementing equipment. In such embodiments, a cement slurry is circulated in the wellbore 116, and one or more fractures 142 in the subterranean formation 100 is encountered while circulating the cement slurry. A filtercake 146 is formed, which at least partially seals the one or more fractures 142 while circulating the cement slurry at least starting at the opening of the fracture(s) 142, and the cement slurry 152 may further enter into the fracture(s) to further seal the fracture(s). In some case, the filtercake 146 and the cement 152 optionally present in fracture(s) 142 bridge the fracture(s) 142, thus allowing wellbore pressure to be maintained up to 30 MPa, or greater, above the wellbore pressure value when the fracture(s) 142 were encountered.

Some embodiments according to the disclosure are methods for simulating building a filtercake in a fracture formed in a subterranean formation. Such methods generally include providing an apparatus that includes one or more blocks of test medium, such as a permeable portion of rock block. The block has a bore there through. A holding frame secures the block(s), or otherwise holder, which includes a drainage port in fluid communication with one end of the bore, and a pressure transducer in fluid communication with a second end of the bore. The apparatus may be used to build a filtercake in situ over a closed fracture formed in the block, or closed fracture defined by mating faces of two blocks. Properties of the filtercake are characterized in situ, the sealing performance of the filtercake determined by opening the fracture and observing sealing failure while increasing pressure, and treatment designs and fluids/components developed and selected to enhance the performance of filtercake sealing of fracture(s).

Figure 3:
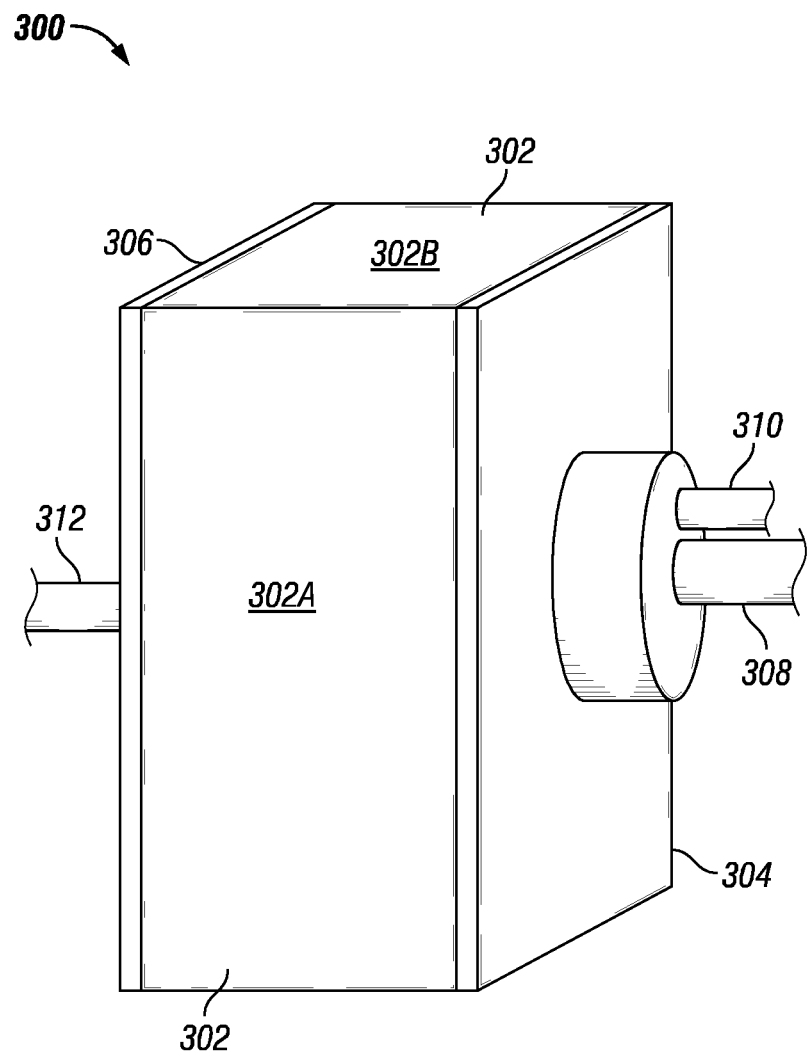
FIG. 3 illustrates an embodiment of an apparatus arrangement useful in some methods of the disclosure, in a perspective view.

In some aspects, the apparatus is a pressure vessel arrangement which includes the holder that is mounted in such a way that when the arrangement is filled with drilling fluid and pressurized, a filtercake forms on the cylindrical surface of the bore wall, and residual filtrate from the drilling fluid drains out of the sides of the test sample. FIG. 3 illustrates one embodiment of an apparatus arrangement useful in some methods of the disclosure, in a perspective view. Apparatus 300 includes a holder 302 for securing a block test medium, which is be fractured in situ. In some cases, after the block is fractured, it may be removed, pulled apart and then replaced as two parts in the arrangement. Plates 304 and 306 are sealingly attached to holder 302 for containing a test drilling fluid under pressure and allowing formation of a filtercake on the bore wall and across the mouth, or opening, of a fracture made in the block. Upon the exterior surface of plate 304 is an accumulator with an electrically driven piston 308 for delivering test drilling fluid at sufficient pressure, such as up to about 14 MPa. While pressure is controlled from the electrically driven piston 308, the test drilling fluid pressure is measured via a transducer 310 disposed on plate 304 proximate to the borehole entrance in the block housed in the holder 302. The orientation of the test medium block in holder 302 is shown in detail in FIGS. 4A through 4C below.

A drainage port is attached at any suitable position of the apparatus, and as shown in the embodiment depicted in FIG. 3, the drainage port and associated drainage line 312 is disposed on the opposing plate 306. Drainage port 312 is used to ensure the bore in the test block is filled without air and to empty the system at the end of the test. Filtrate typically flows through the rock block and out the sides (302A), and in some instances, complete fluid may flow down the fracture and out the sides if the fracture cannot be plugged. Drainage through the port may be governed so as to ensure adequate fluid pressure is resident inside the apparatus 300 and the block. In some aspects, further stress of up to about 20 MPa may be applied to the test block, with independent values in the two directions perpendicular to the wellbore, via suitable pressure application equipment applying force to holder 302 surface 302A and 302B. An example of a suitable pressure application device is a hydraulic jack, or other like device.

Figure 4A:
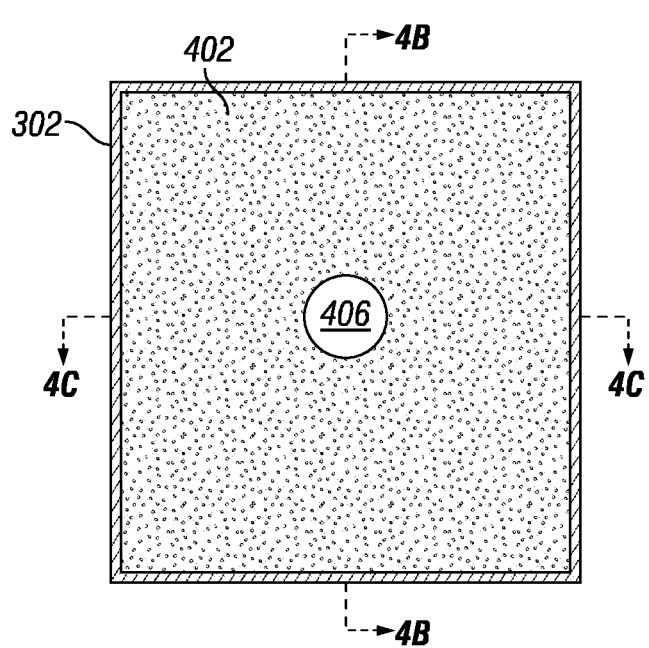
FIGS. 4A-4C shows the orientation of a block of test medium in a holder in accordance with some method embodiments of the disclosure, in sectional views.
Figure 4B:
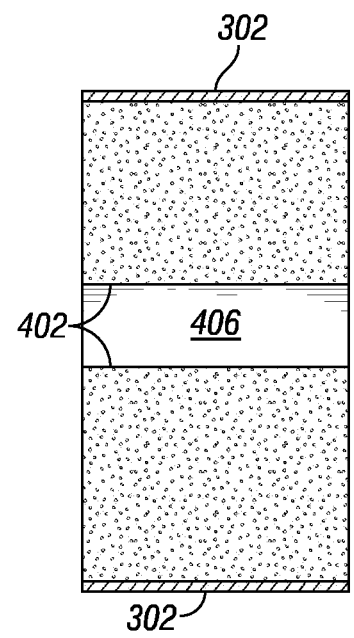
Figure 4C:
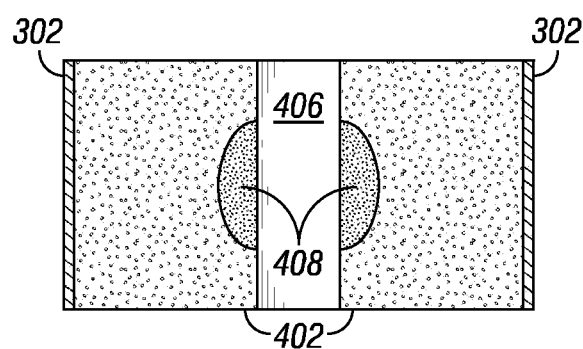

Now referring to FIGS. 4A through 4C, which illustrate the orientation of a block of test medium in holder 302, in cross-sectional views. FIG. 4A is a side sectional view of the holder 302 and block of test medium 402. Block of test medium 402 includes a bore 406 defined therein. When testing is conducted, the bore 406 will be in fluid communication with a test fluid injection/pressure measuring system, such as the driven piston 308 and pressure transducer 310 shown in FIG. 3. FIG. 4B is a sectional view taken at line 4B in FIG. 4A. As depicted in FIG. 4B, the block of test medium 402 has bore 406 there through. FIG. 4C, a sectional view taken at line 4C in FIG. 4A, and shows bore 406. When test fluid is introduced under sufficient pressure, fractures 408 may begin to form in the block of test medium 402. While fracture 408 is shown as planar in orientation, any fracture shape and orientation is within in the scope and spirit of the disclosure. In testing operation, a test fluid enters through bore 406, thereby infiltrating and placing pressure upon test medium 402, and fracture 408.

Figure 4D:
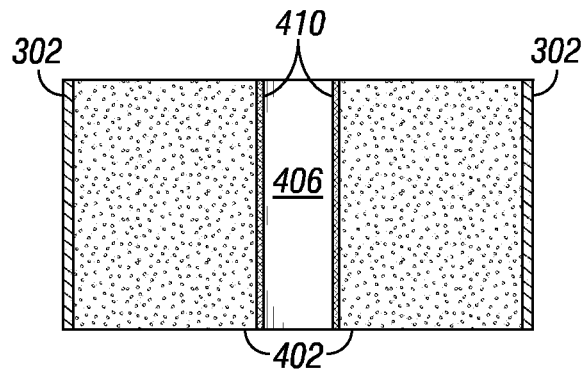
FIGS. 4D-4F, which are in the same orientation as FIG. 4C, depict filtercake deposition, sealing and failure, in accordance with some method embodiments of the disclosure, in sectional views.
Figure 4E:
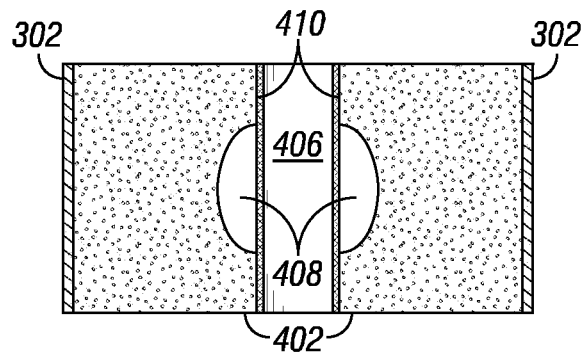
Figure 4F:
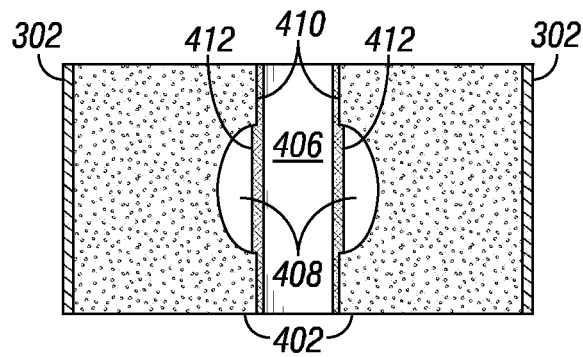

As illustrated in FIG. 4D, which is graphically analogous in orientation to FIG. 4C, as fluid pressure increases, there is fluid filtration into the test rock 402 matrix causing a filtercake 410 to form upon the wall of bore 406 as test drilling fluid is injected under pressure through bore 406. Pressure continues to increase to a point that a fracture 408 initiates as shown in FIG. 4E, and there is a drop in pressure, which then builds up again as fluid flows into fracture 408. Assuming no whole fluid flow into the fracture 408, there is fluid filtration into fracture 408 forming thereby a thicker filtercake 412 over the fracture mouth, as shown in FIG. 4F. Thus, in such cases, filtercake forms at the wellbore wall and over the mouth of the fracture. While the fracture shown in FIGS. 4C, 4E and 4F show a fracture only extending partially through the rock test block 402, in some aspects of the disclosure, the fracture extends completely through the test block, and splits the test block in two pieces. The apparatus and methods described herein are applicable for either case.

In some aspects, when the fracture opens there is a critical fracture width beyond which the filtercake no longer seals the fracture, and drilling fluid then invades the fracture. This can be detected either by a drop in pressure as indicated by the pressure transducer or bulk fluid flow out of the sides of the rock sample. In such way, the pressure properties of the filtercake 410 may be characterized, and such an analysis of a series of fluid may be conducted to identify a drilling fluid composition with sufficient filtercake sealing properties for application in a subterranean formation. Afterward, the identified drilling fluid composition may be prepared and circulated in a wellbore while drilling the wellbore in a subterranean formation, thereby forming a filtercake of sufficient strength in one or more fractures in the subterranean formation.

Figure 4G:
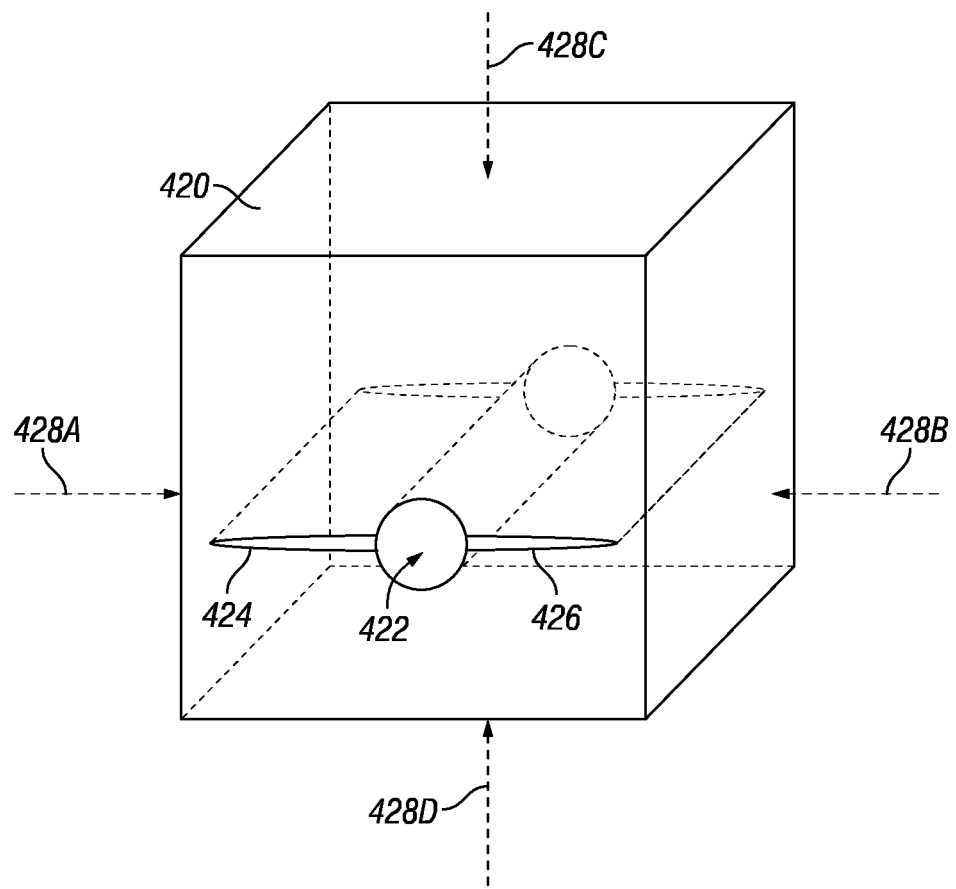
FIG. 4G depicts a test medium block, in accordance with some method embodiments of the disclosure, in a perspective view.

FIG. 4G illustrates another configuration of a test block, in a perspective view. Block of test medium 420 includes bore 422 and fractures, 424 and 426, extending there from. Test fluid is introduced into bore 422 and fluid pressure may be applied by any suitable arrangement, such as that described above. Suitable external stress may be applied on the block of test medium 420, to simulate subterranean formation stress, as indicated by arrows 428A through 428D. This is a diagram of the rock block with the cylindrical wellbore in it. The black arrows show the direction of the external stress applied by the hydraulic presses. In some cases, although not limited to, the arrows from top 428C and bottom 428D, represent an external stress of about 2.1 MPa, and the horizontal arrows 428A and 428B represented an external stress of 3.1 MPa. With the external stress applied, and fluid in the bore pressured, eventually the test medium, such as rock, will crack with the crack forming in the general shape indicated by the shape shown generally as 426. While the fracture 426 shape shown is substantially rectangular, any fracture shape could be formed, whether regular or irregular, such as trapezoidal where fracture is along the full depth of the test medium, and wider nearer the front end of the fracture, but narrower toward the opposite end of the test medium. Also, the shapes may in some cases be planar, while in other cases, may vary from planar, or otherwise irregular, each which may be dependent upon the test medium morphology, test fluid pressures, external stress applied, and the like.

Apparatus 300 may also be used with two rock blocks, as indicated above. The fracture is defined between the two blocks of rock (or other test medium such as porous ceramic, metal frits, etc.) placed in face-to-face contact. These blocks are each mounted in holder 302 so as part of the sides of the rock are exposed. The holder 302 is mounted in a pressure vessel in such a way that when the pressure vessel is filled with drilling fluid and pressurized, filtercake grows on the exposed edges of the rock blocks, and filtrate drains out of the drainage port, open to atmospheric pressure. Also, the holder 302 may be mounted in the pressure vessel in such a way that one or both sides of holder 302 is moved axially to bring the faces of the rock blocks into contact, or move them apart, in a precisely controlled fashion to open the fracture to finite width. This movement is measured so that the width of the fracture is known. A key feature is the precision with which the block movement and fracture width are controlled relative to the size of particles in the fluid that can block or enter the fracture, with a target accuracy, such ±10 microns. When the fracture defined between the two blocks is opened, there is a critical width beyond which the filtercake no longer seals the fracture, and drilling fluid will then invade the fracture. This seal failure point can be detected either by pressure reaching the pressure transducer, bulk fluid flow out of the drainage port extended to the fracture face, or both.

In another variant, one of the sides of the holder 302 is mounted on a freely moving hollow shaft, which protrudes through a respective endcap of the pressure vessel. Faces of the two blocks are again brought into contact to create a closed fracture. Fluid pressure is applied in the vessel to grow the filtercake, and also asserts pressure on the back of the free moving side of holder 302, as a normal force to hold the two plates in contact. The opposing side of holder 302 is then moved axially to control the opening width of the fracture. Once the critical width is reached where the filtercake fails, fluid invades the fracture, thus transmitting pressure to the fracture faces. This pushes the free moving side of holder 302 to its top stop against the endcap of the pressure vessel, indicating seal failure.

In another mode of use in this variant, after growing a filtercake the hollow shaft is then rotated, and the torque and angle of rotation measured. The filtercake will fail under shear, again transmitting pressure to the faces of the fracture. The peak torque and maximum angle of rotation can be used to determine the mechanical properties of the filtercake in relation to its resistance to failure, i.e. the yield stress and strain to yield. Another aspect of this method may be to move the second holder axially a small distance to reduce friction between the plates, and thereby measure the properties of the filtercake alone.

Alternatively, in evaluations where two blocks are used, in some embodiments the filtercake may be formed on both fracture faces before bringing the blocks into face-to-face contact. In such manner, the effects of a filled fracture may be investigated in the same manner as a fracture with filtercake formed thereon.

The testing arrangement, apparatus and methods described above may be useful for adjusting or tailoring filtercake properties in some embodiments, whether the filtercake is formed from drilling fluid, cement, or combination of both. For example, the cement slurry composition could be tailored, or adjusted in situ, to have slightly worse fluid loss control (higher value) than normal, while ultimately providing more efficient sealing. This could be achieved by reducing the fluid loss control additive concentration and/or changing the additive. The same could apply to drilling fluids with an additional parameter of oil:water ratio for oil-based drilling fluids. This approach may also be useful for adjusting the drilling fluid or cement slurry composition used in wellbore operations.

EXAMPLES

Figure 5:
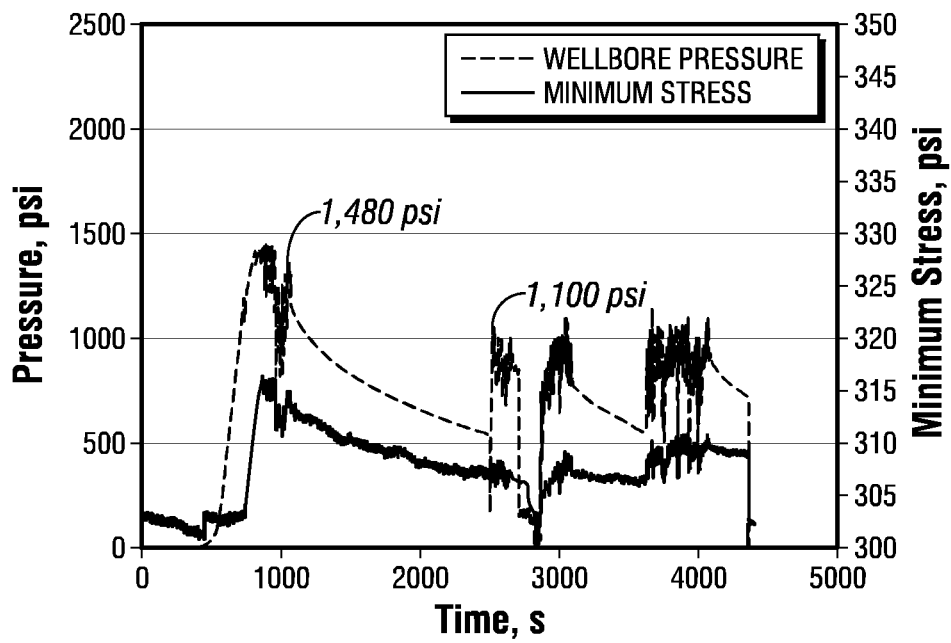
FIG. 5 shows one filtercake's performance over time as fluid pressure is varied, in accordance with the disclosure.

In a first example, drilling mud filtercake pressure characteristics were evaluated using an apparatus similar to that described above and in FIGS. 3 and 4A through 4G. The same apparatus was used for the additional tests described further below. Test drilling fluid was injected into the apparatus and bore fluid pressure was increased to about 1500 psi (10.2 MPa). The evaluation indicated that filtercake formed on wellbore wall and across fracture mouth until whole drilling fluid loss into a fracture, when pressure reached about 1480 psi, at a time of about 800 seconds, as shown in FIG. 5. Fluid pressure was decreased to close the fracture, then increased at time of about 2800 seconds, where the fracture reopened and seal the failed at a pressure of about 1100 psi (7.6 MPa), and then repeated at times of about 3000 seconds and 3800 seconds. The drilling fluid used in the example was RHELIANT™ drilling fluid available from MI-SWACO, Houston, Tex., and the drilling fluid had a density of 1510 kg-m$^{-3}$ (12.6 lbm/gal), oil:water ratio of 79:21, and solids content 24% by volume.

Figure 6:
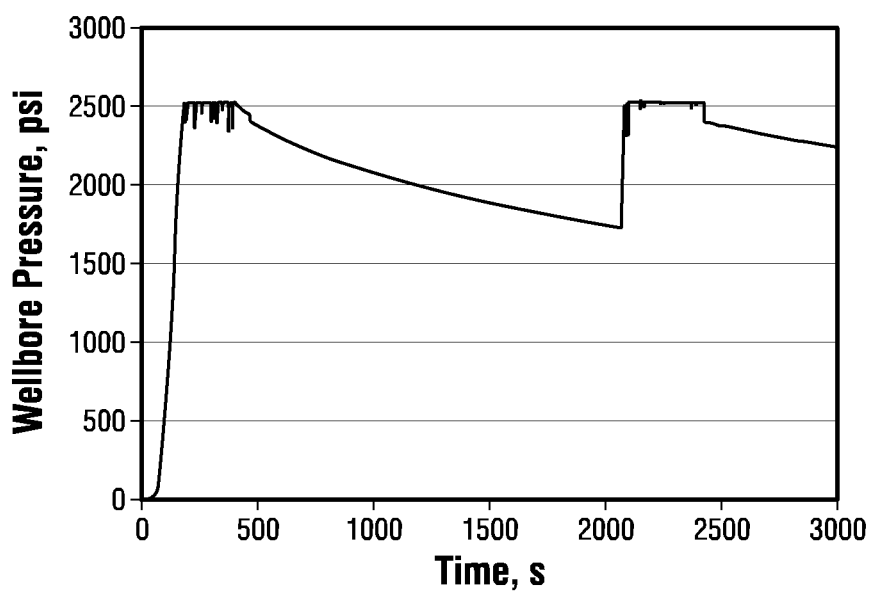
FIG. 6 shows another filtercake's performance over time as fluid pressure is varied, in accordance with the disclosure.

FIG. 6 shows the pressure characteristics of a second fluid evaluated using the apparatus similar to that described above and in FIGS. 3 and 4A through 4G. The test fluid evaluated in this example was the RHELIANT™ drilling fluid with a graphite wellbore strengthening material added at 20 pounds per barrel. Pressure was increased as the test fluid was injected into the apparatus and bore and filtercake deposited in the fracture. The evaluation indicated that the bore sustained a fluid pressure of about 2500 psi (17.2 MPa) without losing significant amounts of drilling fluid.

Figure 7A:
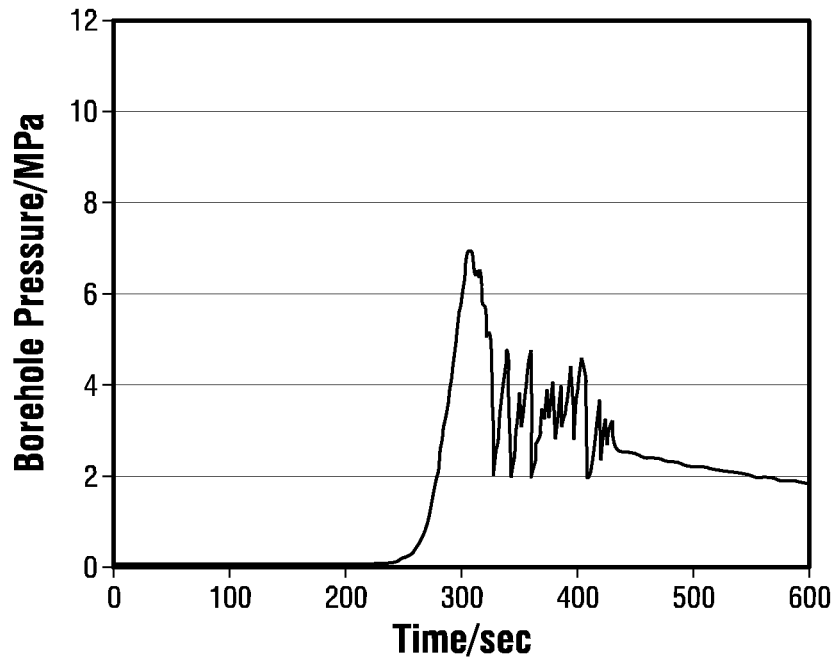
FIGS. 7A and 7B show filtercake performance based upon different filtercake building pressures over time, in accordance with the disclosure.
Figure 7B:
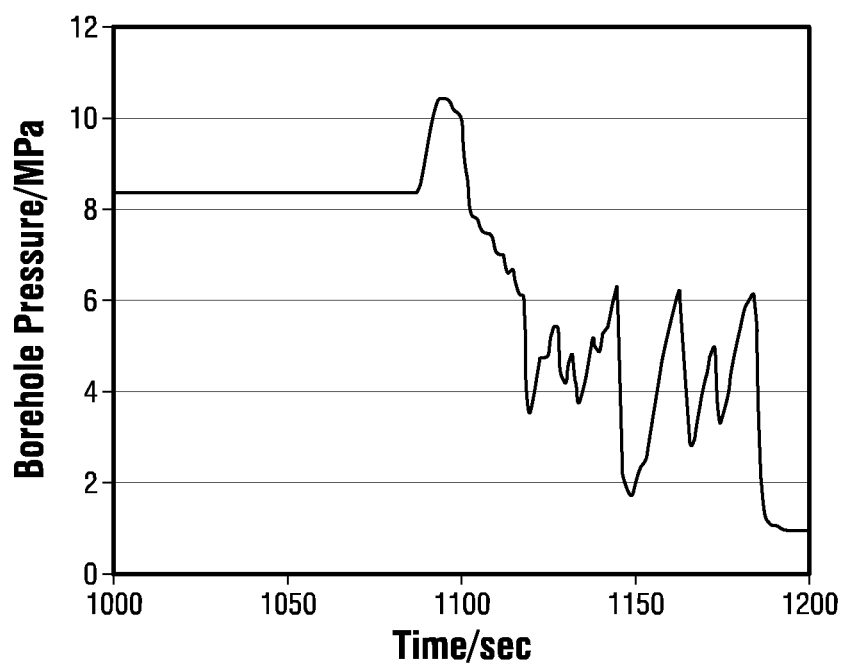

In a third example, the RHELIANT™ drilling fluid was used to evaluate how the filtercake could be enhanced through modification of pressure during the drilling procedure. As shown in FIG. 7A, the drilling fluid was injected into the apparatus and bore fluid pressure was increased to about 7 MPa from time 250 seconds to 300 seconds. As shown, the sudden ramp up in pressure led to significant loss of drilling fluid, as shown by the steep and significant decreases in bore fluid pressure. In another evaluation, fluid pressure in the bore was more gradually increased, and the drilling fluid formed a filtercake on the wall of the bore, and entered the fracture further building the filtercake in the mouth of the fracture, over a longer period of time. FIG. 7B shows the pressure characteristics of the filtercake built in this process, which exhibited strength adequate to maintain 10.5 MPa of fluid pressure in the bore. With the additional filtercake building process, the bore sustained an additional 3.5 MPa of fluid pressure. In some other aspects, modifying the drilling fluid design to result in higher spurt loss could produce the same type of enhancement.

Figure 8:
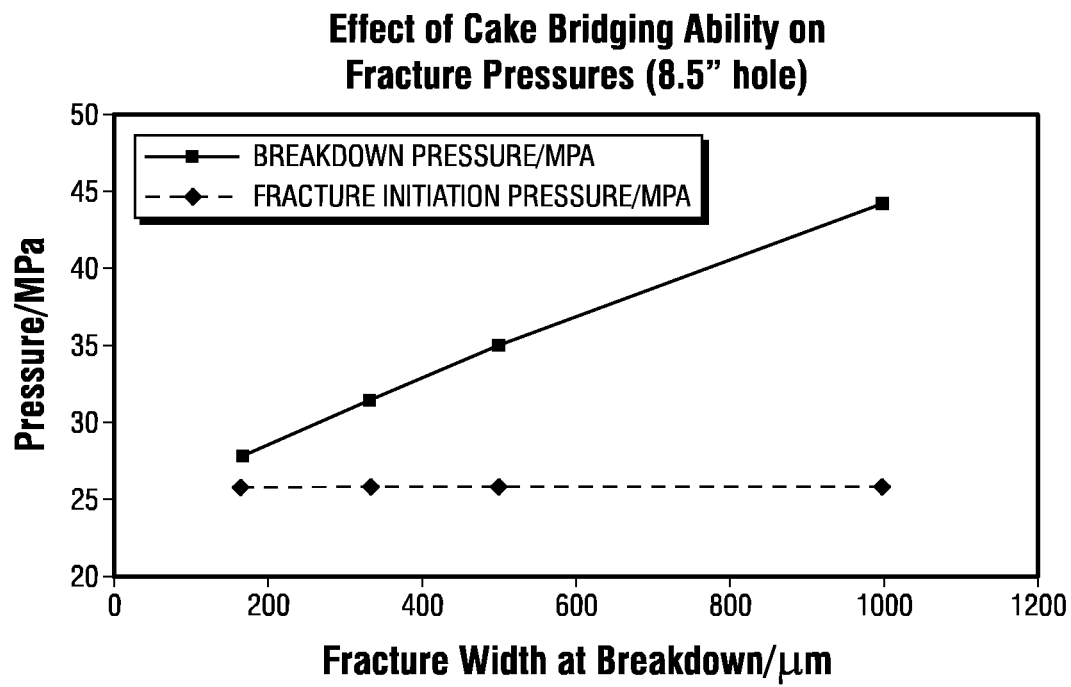
FIGS. 8 and 9 depict models of filtercake breakdown properties in comparison to fracture initiation pressures, according to an aspect of the disclosure.

Using the techniques described above, a model can be built for demonstrating and predicting the effect of filtercake bridging on fracture pressure and fracture toughness, and thus wellbore strengthening. FIG. 8 shows a model correlation of filtercake breakdown pressure versus fracture width in comparison to fracture initiation pressure versus fracture width. Further, the modeling results show the effects of the ability of filtercake in preventing fluid flow into the fracture and thus on wellbore strengthening. In this example, it is assumed the filtercake can seal any of a 0.17 mm, 0.33 mm, 0.5 mm or even up to 1 mm wide fracture. Regardless how strong the filtercake is, the fracture initiation pressure is approximately the same. However, a stronger filtercake for inhibiting drilling fluid flow into the fracture can sustain much higher wellbore pressure without causing lost circulation. Using such an approach, the filtercake may be engineered to achieve a certain wellbore strengthening specifications.

Figure 9:
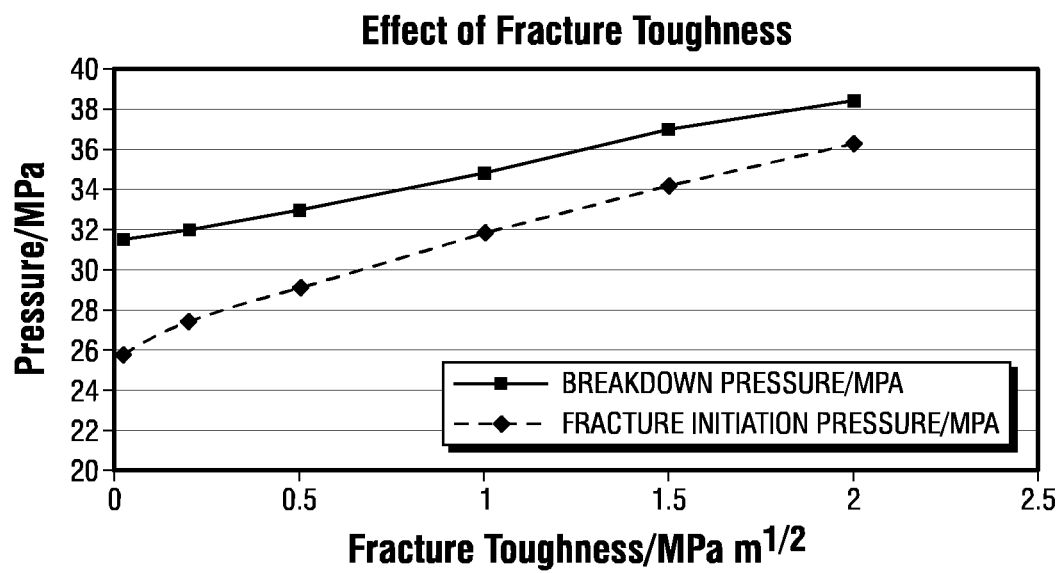

This mechanism of wellbore strengthening by filtercake also applies to sealing and strengthening of natural fractures, in addition to induced fractures, as described above. Both laboratory tests conducted using apparatus described above, and modeling techniques show how to apply the practice to drilling operations of either naturally fractured formation or drilling induced fractures. FIG. 9 shows the difference of strengthening a natural fracture and a drilling induced fracture. In this example, the rock with natural fractures is modeled as fractured rock with a near-zero fracture toughness, and the induced fractures have a toughness greater than near-zero MPa-m$^{1/2}$. As depicted, filtercake breakdown pressure is higher than fracture initiation pressure along the continuum of fracture toughness values, and achieves certain wellbore strengthening specifications.

In a fourth example, RHELIANT™ drilling fluid was placed in the test medium bore and pressurized to 3.5 MPa for 10 minutes, to form a filtercake. The drilling fluid was removed and a cement slurry was placed into the bore. The formulation and properties of the cement slurry are given below. The fluid loss measured at room temperature (the temperature of the rock fracturing tests) was 50 mL API. The thickening time was sufficiently long to allow the tests to be completed before the cement set. The composition of the cement slurry is given in Table 1.

TABLE 1

| Product Class H cement | Concentration |
| --- | --- |
| Silicone based antifoam | 2.7 L/tonne |
| Polycarboxylate dispersant | 4.4 L/tonne |
| AMPS-Acrylamide fluid loss control additive | 34.2 L/tonne |
| Phosphonate based retarder | 5 L/tonne |
| Water | 360 L/tonne |
| Density | 1965 kg m$^{-3}$ [16.4 lbm/gal] |
| PV | 155 cp |
| Ty | 7.7 Pa [16 lbf/100 ft$^2$] |
| API Fluid loss room temperature | 50 mL (average of 2 measurements) |
| Thickening time (25 deg C., 13.8 MPa) | 10 hours |

Figure 10:
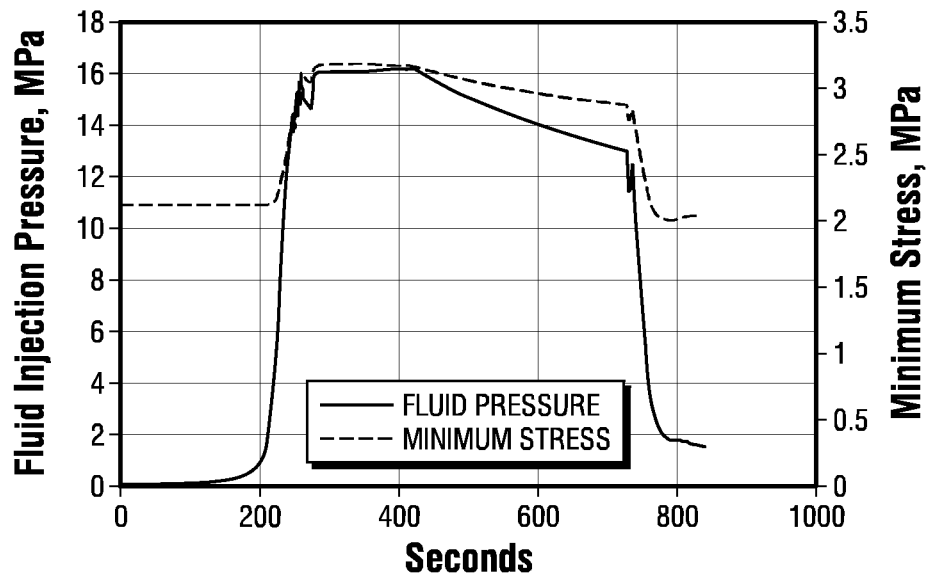
FIG. 10 graphically shows fluid injection pressure and minimum stress as a function of time for pressure injection of a cement slurry in a test conducted, according to an aspect of the disclosure.

The cement slurry was injected into the wellbore at a rate of 15 mL/min. The fluid injection pressure and the minimum stress as a function of time are shown in FIG. 10. The test medium rock fractured as the injection pressure increased, as indicated by the breaks in the pressure-time plots around 250 seconds. However, flow into the induced fractures was prevented by the slurry and finally a pressure of 16 MPa was maintained. Injection was stopped at just after 400 seconds. In post test inspection, nodules of filtercake could be seen over the fracture entrance, and when removed from the test apparatus, the test medium rock readily split into two pieces along the plane of the fracture. Minimum penetration of the cement slurry into the fracture was also observed. Thus, it was concluded that significant losses of fluid was prevented by the formation of the nodes of filtercake across the fracture entrance.

Figure 11:
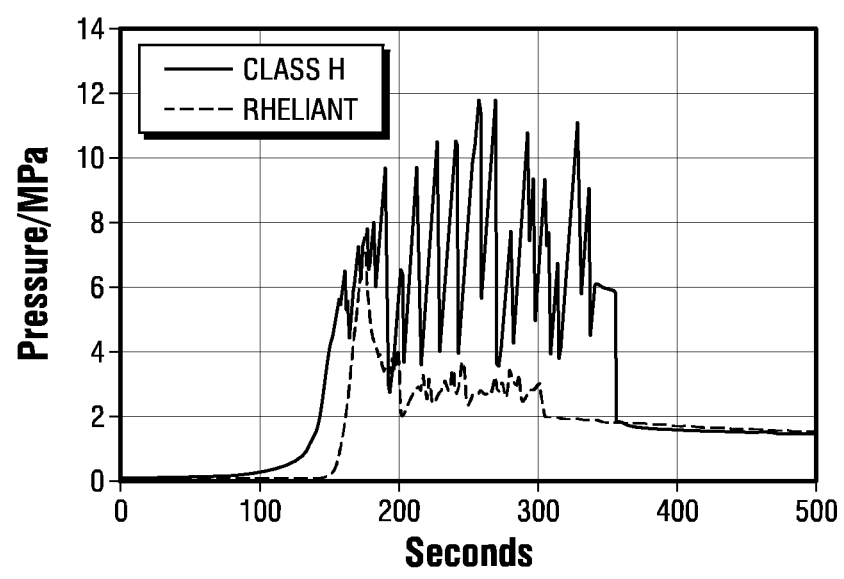
FIG. 11 graphically shows fluid pressure as a function of time for pressure injection of drilling fluid and cement slurry in a test conducted, according to an aspect of the disclosure.

In a fifth example, RHELIANT™ drilling fluid was injected into a test medium rock sample, and the pressure increased until the rock fractured. The drilling fluid was removed from the wellbore and replaced with the same cement slurry formulation as in example four above. The cement slurry was injected at a rate of 15 mL/min and the injection pressure monitored. The results for the drilling fluid and the cement slurry are shown in the plot of pressure versus time shown in FIG. 11. During injection of the drilling fluid the pressure increased up to about 7 MPa at which point the rock fractured and the wellbore pressure of the drilling fluid remained below 4 MPa. With the cement slurry, the pressure could be maintained consistently above 4 MPa. The variations of the pressure correspond to building of a filtercake that seals the fracture entrance and then partially fails before rebuilding occurs.

Figure 12:
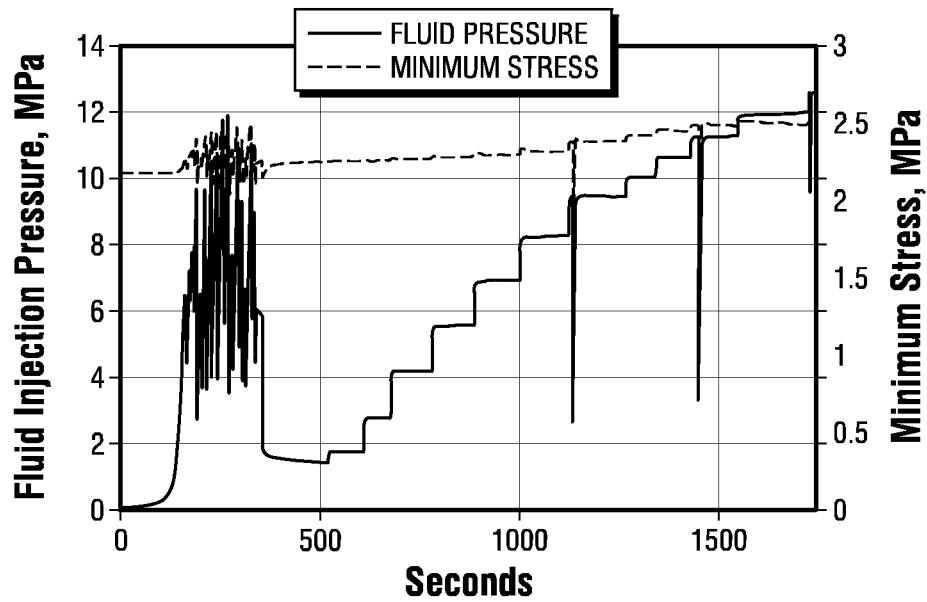
FIG. 12 graphically shows fluid injection pressure and minimum stress as a function of time for pressure injection of cement slurry in a test conducted, according to an aspect of the disclosure.

The test with the cement slurry was continued but with the cement slurry pressure increased in steps (not constant injection rate) and held at each step for 2 minutes. This allowed more time for a filtercake to develop. Under this process the pressure could be increased to 12 MPa, as shown in FIG. 12. The loss of pressure at 1150 and 1450 seconds corresponds to failure of the filtercake in a small area but there was rapid re-sealing. The pressure oscillations between 150 and 350 seconds are the oscillations shown in FIG. 11.

In post test inspection, the rock sample was removed from the apparatus, and was easily split in two along the fracture plane. Nodes of cement filtercake were observed along the entrance to the fracture along the sample bore. The cement filtercake had controlled losses in this situation with only part of the fracture receiving sufficient fluid so that it reached the edge of the test sample.

Figure 13:
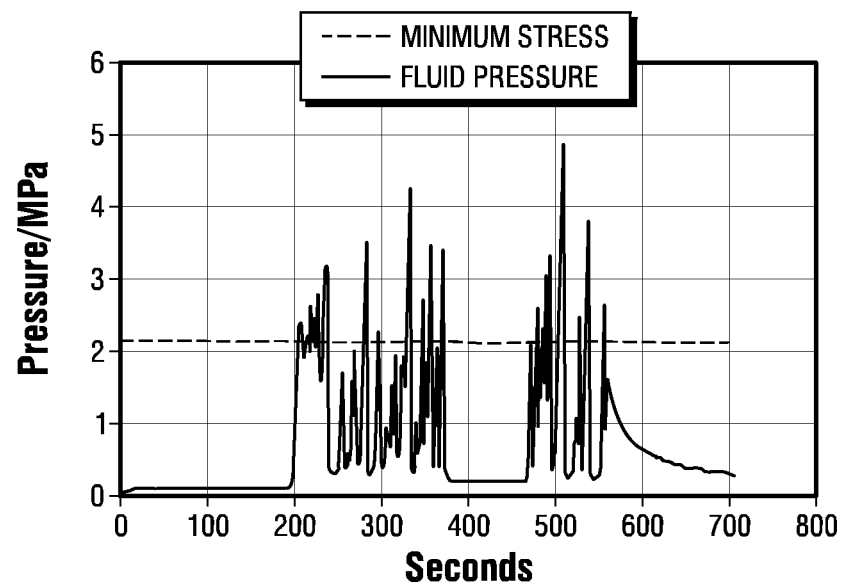
FIG. 13 graphically shows fluid injection pressure and minimum stress as a function of time for pressure injection of cement slurry in a test conducted, according to an aspect of the disclosure; and, FIG. 14 graphically shows fluid injection pressure and minimum stress as a function of time for pressure injection of cement slurry in a test conducted, according to an aspect of the disclosure.

In a sixth example, a process similar to the fifth example was initially followed. However, once the rock was fractured with drilling fluid, the test medium rock block was removed from the apparatus and split along the fracture. The rock was then reassembled and placed back into the apparatus and cement slurry (formulated as in the other tests and shown in Table 1) injected into the fractured rock at a rate of 15 mL/min. In this case the process of disassembling and re-assembling the rock created a fracture that is slightly wider than that created in example five, as the two halves could not be perfectly put back together. The fluid injection pressure is shown in FIG. 13. The cement could not prevent whole fluid flow down the fracture as the entrance was too wide and filtercake could not be formed. The test rock was removed from the apparatus and the two halves separated. Observation showed that cement slurry had penetrated along the fracture across the whole sample. A filtercake was visible across the fracture mouth, but it was unable to block fluid flow down the fracture.

Figure 14:
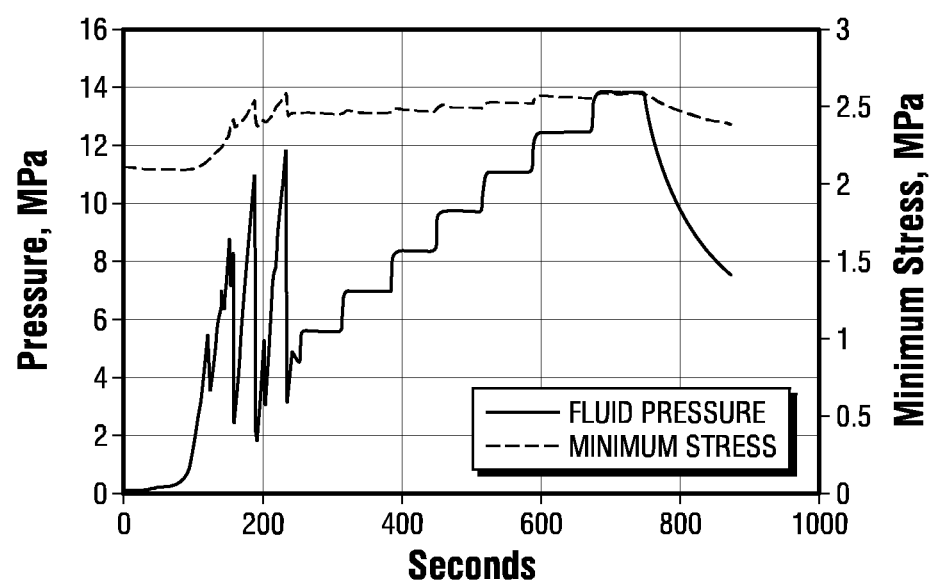

In a seventh example, a process similar to the sixth example was initially followed, except that the cement slurry formulation contained 5.8 kg/m$^3$ of alkali resistant glass fibers 12 mm long and 20 microns in diameter, available from Owens Corning under the tradename Cem-FIL® 70 12 mm. The initial injection of the cement slurry into the pre-fractured rock test medium was at 15 mL/min up to about 250 seconds, and then the pressure was increased in steps up to 13 MPa, as shown in FIG. 14. In the first injection period (injection at constant rate), the presence of fibers allowed higher pressures to be reached, as the fibers helped provide a support for the filtercake. As the pressure was subsequently ramped up in pressure steps there was a longer time for filtercake to form so the resulting structure could support a higher pressure. This test indicated that the presence of fibers allowed the system to prevent losses into larger fractures.

For examples four through six the drilling fluid and the cement slurry were injected directly into the sample bore from a pump reservoir. In example seven with fibers, the slurry could not be injected directly from the pump. In this case the cement slurry with fibers was placed in an intermediate reservoir with piston. The pump injected water to one side of the piston and cement slurry was pushed out from the reservoir the other side of the piston.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A method, comprising:
   circulating a drilling fluid in a wellbore penetrating a subterranean formation wherein the wellbore has a wellbore pressure;
   forming a filtercake along the wellbore from the drilling fluid;
   encountering one or more fractures in the subterranean formation with the drilling fluid;
   at least partially sealing the one or more fractures with at least a portion of the filtercake; and introducing a cement slurry to further build the filtercake and sealing the one or more fractures wherein the wellbore pressure is increased in a plurality of steps and in an amount less than or equal to 3.5 MPa per step, the one of more fractures are sealed and the wellbore strengthened.

2. The method of claim 1, wherein the cement slurry further comprises fibers.

3. The method of claim 2, wherein the filtercake bridges the one or more fractures thus allowing the wellbore pressure to be maintained at up to 16 MPa above the wellbore pressure when the one or more fractures were encountered.

4. The method of claim 1, wherein the cement slurry remains fluid while being introduced into the wellbore at each of the plurality of steps- and further builds the filtercake at the mouth of, and/or at the walls of, the one or more fractures.

5. The method of claim 4, wherein the filtercake built allows wellbore pressure to be maintained up to 20 MPa above a wellbore pressure value when the one or more fractures were encountered.

6. The method of claim 1, wherein at least one of the fractures is induced while drilling.

7. The method of claim 1, wherein at least one of the fractures is a natural fracture in the subterranean formation.

8. A method, comprising:
 circulating a cement slurry in a wellbore having a wellbore pressure and penetrating a subterranean formation;
 encountering one or more fractures in the subterranean formation while circulating the cement slurry;
 at least partially sealing the one or more fractures by forming a filtercake in the wellbore while circulating the cement slurry; and
 increasing the wellbore pressure in a plurality of steps in an amount less than or equal to about 3.5 MPa per step wherein the one or more fractures are sealed and the wellbore is strengthened.

9. The method of claim 8, further comprising introducing the cement slurry into the one or more fractures to further seal the one or more fractures.

10. The method of claim 8, wherein the wellbore comprises a casing herein, and wherein the cement slurry circulates through the casing and annulus formed between the casing and the subterranean formation.

11. The method of claim 8, wherein the cement slurry further comprises fibers.

12. The method of claim 8, wherein the cement slurry remains fluid while being introduced into the wellbore, but forms a filtercake at the mouth of, and/or at the walls of, the one or more fractures.

13. The method of claim 12, wherein the filtercake and the cement present in the one or more fractures bridge the fracture(s) thus allowing wellbore pressure to be maintained up to 20 MPa above the wellbore pressure value when the one or more fractures were encountered.

14. The method of claim 8, wherein at least one of the fractures is induced while circulating the cement.

15. The method of claim 8, wherein at least one of the fractures is a natural fracture in the subterranean formation.

16. The method of claim 8, further comprising adjusting the cement slurry composition to form the filtercake which at least partially seals the one or more fractures while circulating the cement slurry.

17. A method, comprising:
 circulating a drilling fluid in a wellbore penetrating a subterranean formation, wherein the wellbore has a wellbore pressure;
 forming a filtercake along the wellbore;
 encountering one or more fractures in the subterranean formation; and
 sealing the one or more fractures in the subterranean formation with the filtercake, wherein the wellbore pressure is increased in a plurality of steps in an amount less than or equal to 3.5 MPa per step and between about 5 MPa and about 20 MPa in total.

18. The method of claim 17, wherein the drilling fluid comprises a cement slurry.

19. The method of claim 17, further comprising the step of introducing a wellbore strengthening material into the drilling fluid.

20. The method of claim 17, further comprising introducing fibers into the drilling fluid.

21. The method of claim 17, wherein the one or more fractures in the subterranean formation are at least partially sealed with at least a portion of the filtercake when encountered by the drilling fluid.

22. The method of claim 17, wherein the one or more fractures are 0.17 mm, 0.33 mm, 0.5 mm or between 0.5 to 1.0 mm wide.

\* \* \* \* \*